United States Patent [19]

Hipkins et al.

[11] 4,208,621
[45] Jun. 17, 1980

[54] BRUSHLESS DC MOTOR CONTROL SYSTEM

[75] Inventors: Dennis R. Hipkins, Hopkins, Minn.; Marvin L. Schiedermayer, Appleton, Wis.

[73] Assignee: Electro-Craft Corporation, Hopkins, Minn.

[21] Appl. No.: 920,722

[22] Filed: Jun. 30, 1978

[51] Int. Cl.² .......................................... H02K 29/00
[52] U.S. Cl. ..................................... 318/138; 318/254
[58] Field of Search ........................ 318/254, 138, 416

[56] References Cited

U.S. PATENT DOCUMENTS

| 3,999,108 | 12/1976 | Tanikoshi ............................. 318/138 |
| 4,088,932 | 5/1978 | Okuyama et al. ..................... 318/138 |

FOREIGN PATENT DOCUMENTS

896707  3/1972  Canada ................................... 318/138

*Primary Examiner*—J. V. Truhe
*Assistant Examiner*—John W. Redman
*Attorney, Agent, or Firm*—Schroeder, Siegfried, Ryan, Vidas, Steffey & Arrett

[57] ABSTRACT

A closed control system for controlling the operation of a multiple horsepower brushless direct current motor wherein a current feedback signal representative of the effective motor drive current is constructed from the instantaneous currents flowing in the stator windings. Protective circuitry is provided to shutdown the output power stages in the event of component failures to prevent catastrophic failure of other components in the system.

9 Claims, 9 Drawing Figures

| POSITION ELECTRICAL | POSITION MECHANICAL | MOTOR CURRENT PATH | COM CODE | ACTIVE PHASE | CORRECT CW | SENSOR CCW |
|---|---|---|---|---|---|---|
| 0° | 0° | | 101 | 1 & 2 | $-I_2$ | $I_1$ |
| 60° | 30° | | 100 | 1 & 3 | $I_1$ | $-I_3$ |
| 120° | 60° | | 110 | 2 & 3 | $-I_3$ | $I_2$ |
| 180° | 90° | | 010 | 2 & 1 | $I_2$ | $-I_1$ |
| 240° | 120° | | 011 | 3 & 1 | $-I_1$ | $I_3$ |
| 300° | 150° | | 001 | 3 & 2 | $I_3$ | $-I_2$ |

Fig. 4

| A₁ | ⌐ | ⌐ | 1 | 0 | 0 | 1 | ⌐ | ⌐ | 0 | 1 | 1 | 0 |
|---|---|---|---|---|---|---|---|---|---|---|---|---|
| A₂ | 0 | 1 | ⌐ | ⌐ | 1 | 0 | 1 | 0 | ⌐ | ⌐ | 0 | 1 |
| A₃ | 1 | 0 | 0 | 1 | ⌐ | ⌐ | 0 | 1 | 1 | 0 | ⌐ | ⌐ |
| R | 1 | 1 | 1 | 1 | 1 | 1 | 0 | 0 | 0 | 0 | 0 | 0 |
| DIRECTION | CW | CW | CW | CW | CW | CW | CCW | CCW | CCW | CCW | CCW | CCW |

($\_\!\!\ulcorner$) 0 TO 1 TRANSITION OR LEADING EDGE
($\urcorner\!\!\_$) 1 TO 0 TRANSITION OR TRAILING EDGE

Fig. 5

| R | A₁ | A₂ | A₃ | DECODER OUTPUT | SELECTED CURRENT SIGNAL |
|---|---|---|---|---|---|
| 0 | 0 | 0 | 0 | 0 | NONE |
| 0 | 0 | 0 | 1 | 1 | $-I_2$ |
| 0 | 0 | 1 | 0 | 2 | $-I_1$ |
| 0 | 0 | 1 | 1 | 3 | $I_3$ |
| 0 | 1 | 0 | 0 | 4 | $-I_3$ |
| 0 | 1 | 0 | 1 | 5 | $I_1$ |
| 0 | 1 | 1 | 0 | 6 | $I_2$ |
| 0 | 1 | 1 | 1 | 7 | NONE |
| 1 | 0 | 0 | 0 | 8 | NONE |
| 1 | 0 | 0 | 1 | 9 | $I_3$ |
| 1 | 0 | 1 | 0 | 10 | $I_2$ |
| 1 | 0 | 1 | 1 | 11 | $-I_1$ |
| 1 | 1 | 0 | 0 | 12 | $I_1$ |
| 1 | 1 | 0 | 1 | 13 | $-I_2$ |
| 1 | 1 | 1 | 0 | 14 | $-I_3$ |
| 1 | 1 | 1 | 1 | 15 | NONE |

BRUSHLESS DC MOTOR CONTROL SYSTEM

This invention relates generally to electronics and more specifically to a motor control system for a large brushless motor. Even more specifically, the invention relates to a control system utilizing a logic circuit to select a feedback signal representative of the motor current and utilizing a plurality of protective circuits to provide a system in which failure of a single component will not trigger a catastrophic failure of other components.

Attempts in the prior art to provide a control system for large brushless motors rated in the twenty horsepower range have been frustrating because of the tendency of such systems to be substantially destroyed in the event of a single failure of a minor component. It has also been difficult in such systems to provide a current feedback signal which is representative of the current actually driving the motor because of the use of multiple windings in such a motor which are sequentially energized.

The present invention, on the other hand, provides an improved control system wherein a current feedback signal is selected from the currents in the multiple stator windings and wherein various protective circuits are used to isolate component failures and prevent them from causing a catastrophic failure of other components.

It is, therefore, an object of the present invention to provide an improved brushless motor control system.

Other objects and advantages of the present invention may be ascertained from a reading of the specification and appended claims in conjunction with the drawings wherein like reference characters are used to designate similar elements and wherein:

Figure 1A:
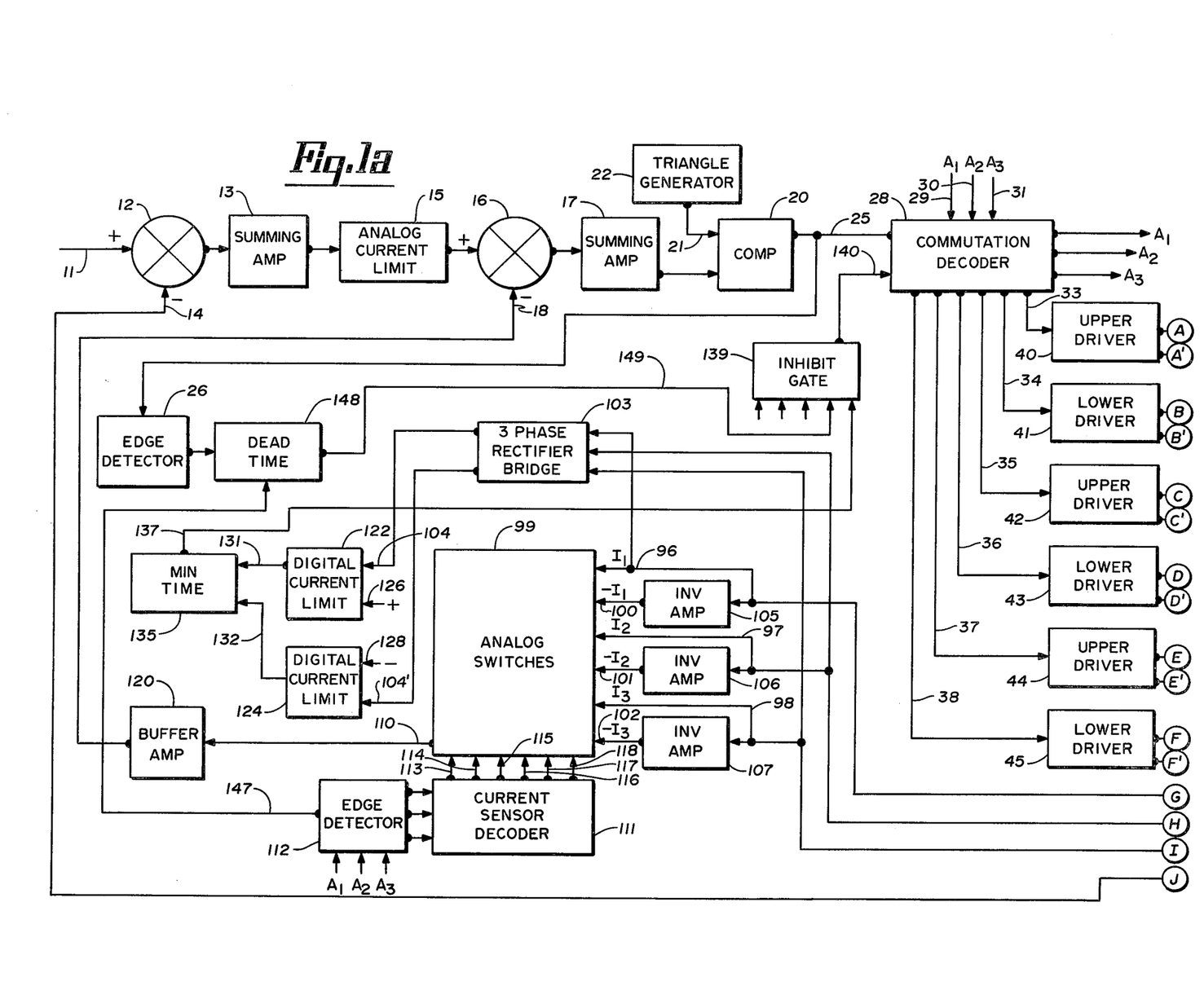
FIGS. 1a and 1b are a schematic diagram of the overall closed loop brushless motor control system.
Figure 1B:
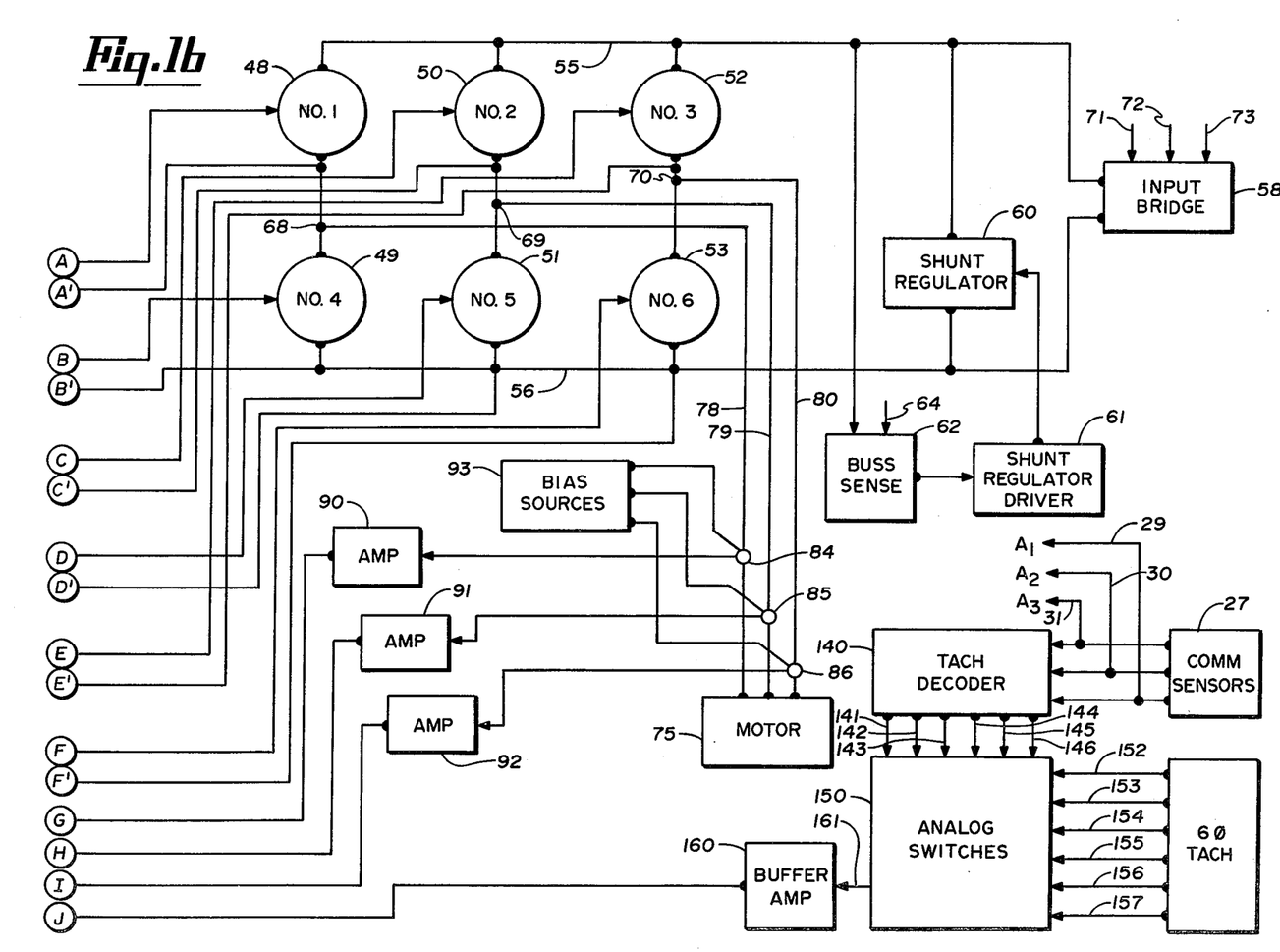

Turning now to FIGS. 1a and 1b, the entire control system is shown in functional diagram form. A velocity command 11 is applied to a summing junction 12 of a summing amplifier 13 which also receives a tachometer feedback signal 14 to close the control loop. The output of summing amplifier 13 is passed through an analog current limit circuit 15 which places an upper limit on the magnitude of the signal delivered from the summing amplifier 13 to the summing junction 16 of a second summing amplifier 17 which receives a closed loop composite current feedback signal 18. The amplified error signal from summing amplifier 17 is connected to one input of a comparator 20 which receives its other input 21 from a triangle generator 22 and produces a pulse width modulated output signal at its output with a duty cycle proportional to the magnitude of the error signal from amplifier 17.

Figure 7A:
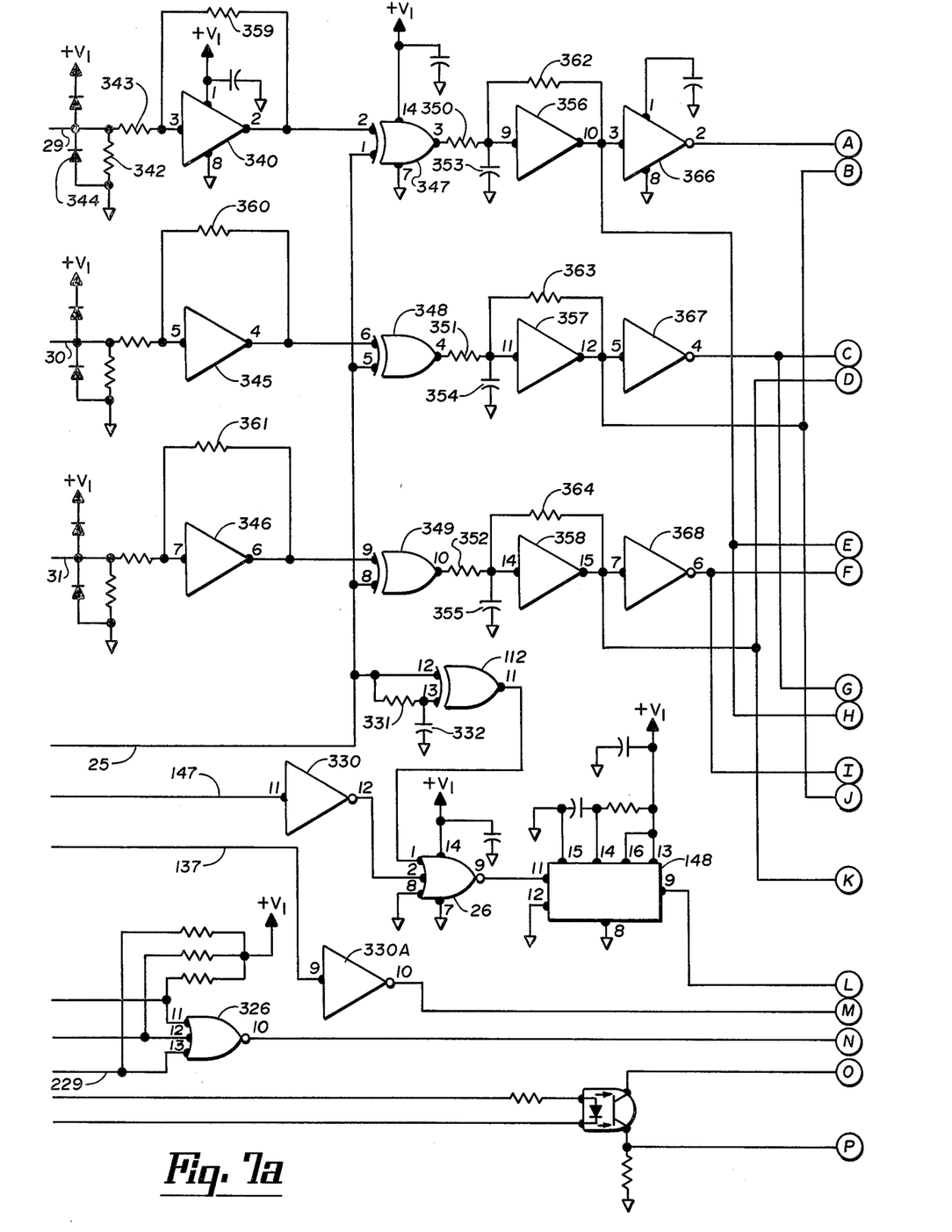
FIGS. 7a and 7b are a schematic diagram of the commutation decoder logic.

The pulse width modulated output signal 25 from comparator 20 is connected to an edge detector circuit 26 and to the input of commutation decoder 28 which also receives three signals 29, 30, and 31 from motor commutation sensors 27, shown in FIG. 1b, which produce signals indicative of the shaft position of the controlled three-phase brushless direct current motor 75. Commutation decoder 28 provides upper and lower drive command signals for the driver circuits 40–45 associated with the output power stages 48–53 associated with each of the motor phase windings and is described more fully in FIG. 7. These signals on lines 33–38 are inputs to lower drive circuits 41, 43, and 45 and upper drive circuits 40, 42, and 44, an example of which is shown in detail in FIG. 2.

The drive signals at terminals A–F from driver circuits 40–45 are connected in turn to supply base drive current to output power transistors 48–53 which are high current capacity power transistors comprising the output switches.

The output bridge is connected between a positive bus 55 and a power ground bus 56 which receive DC voltage from a DC supply 58 which, in the preferred embodiment shown, is shown as energized by conventional three-phase AC power source on lines 71, 72, and 73. A shunt regulator 60, controlled by a shunt regulator driver 61, is utilized to clamp the maximum DC bus voltage between buses 55 and 56 to a predetermined value. Shunt regulator driver 61 receives its input signal, in the preferred embodiment shown, from a bus sensing comparator 62 which compares the voltage at the positive bus 55 to a reference voltage 64. While a simple regulator 60 is shown, it is also possible, without departing from the present invention, to utilize a more elaborate shunt regulator which would include an over-voltage crowbar and both over-current and over-voltage sensing to control the DC voltage applied to the output bridge between conductors 55 and 56 and to remove the drive voltage to the output bridge transistor in appropriate out-of-tolerance situations.

The common terminal 68 between switches 48 and 49, the common terminal 69 between switches 50 and 51, and the common terminal 70 between switches 52 and 53 are connected respectively to the three terminals of the star connected stator windings of brushless motor 75 through conductors 78, 79, and 80 respectively. The currents $I_1$, $I_2$, and $I_3$ through each of the various stator windings of motor 75 are sensed by sensing the respective currents in conductors 78, 79, and 80 using current sensors 84, 85, and 86 respectively whose output signals representative of the current sensed are amplified by amplifiers 90, 91, and 92 respectively.

A bias source 93 is used to adjust the gain of sensors 84–86. The output signals from amplifiers 90, 91, and 92, on terminals G, H, and I, representative of currents $I_1$, $I_2$, and $I_3$, are delivered to input terminals 96, 97, and 98 of an analog switch array 99, shown in FIG. 1a, which receives signals at inputs 100, 101, and 102 which are the inverse of the signals at inputs 96, 97, and 98 respectively due to the inverting action of amplifiers 105, 106, and 107.

Figure 5:
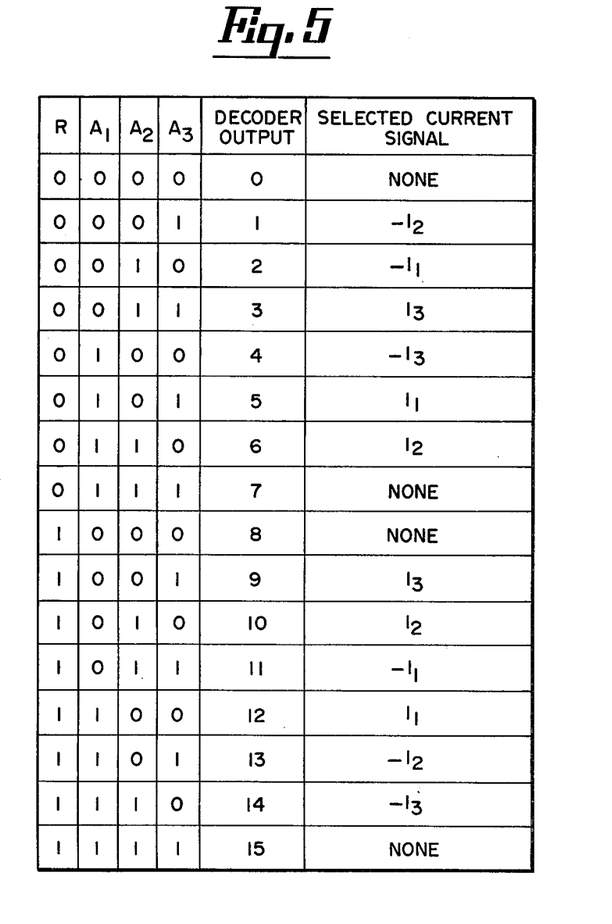
FIG. 5 is a table showing the relationship of rotation and commutation codes and the currents selected.
Figure 6:
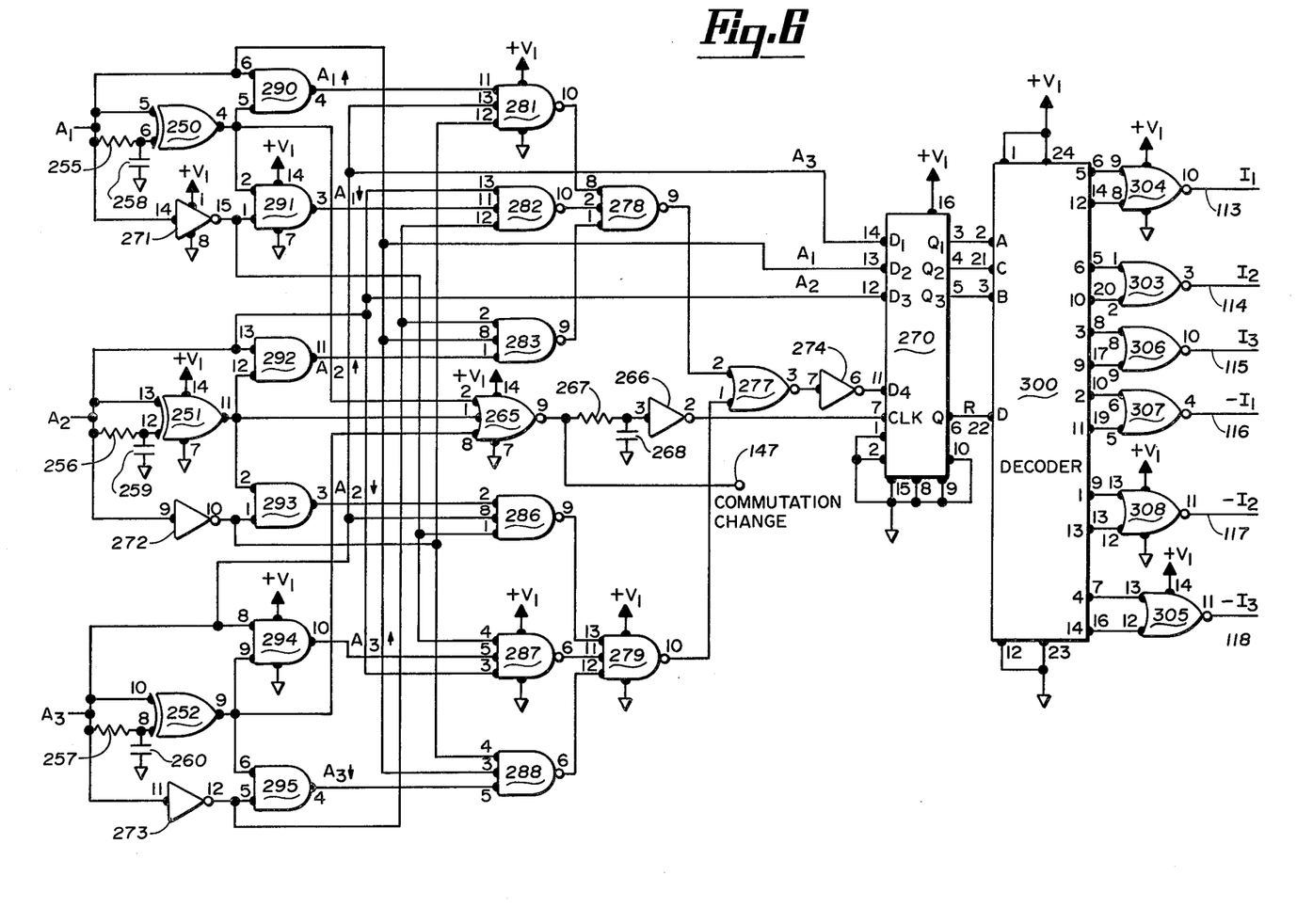
FIG. 6 is a diagram of the current selection logic.

Analog switch module 99 produces an output signal at terminal 110 selected from the input signals at terminals 96–98 and 100–102 by logic signals 113–118 appearing at the output of a current sensor decoder 111 which is shown in more detailed form in FIG. 6. The output signals on conductors 113–118 are used to turn ON a field effect transistor in series with a selected current signal to select one of the six analog signals appearing at the analog switch module 99, inputs 96–98 and 100–102, for delivery to output terminal 110. The operation of the current sensor decoding circuitry 111 and edge detector 112 is described in more detail in connection with the discussion of FIGS. 3–6 below.

The signal on conductor 110 is proportional to the composite drive current of motor 75 and, after being passed through buffer amplifier 120, is applied to the inverting summing junction 18 of summing amplifier 17 to close an inner negative feedback loop on the motor current variable. The current signals on conductors 96–98 are applied to a three phase rectifier bridge 103. The bridge output signals on conductors 104 and 104' are compared to a positive reference 126 by a comparator 122 and to a negative reference 128 by a comparator 124 to respectively produce positive over-current or negative over-current indications on terminals 131 and 132 when the magnitude of one of the signals delivered to bridge 103 indicates that the current exceeds a limit value determined either by positive reference 126 or negative reference 128. Once a high current indication on conductor 131 or 132 is present, circuit 135 generates a drive inhibit signal on line 137 which persists for a predetermined minimum time interval. This drive inhibit signal on terminal 137 causes inhibit gate 139 to generate an output signal on conductor 140 which, when applied to an input terminal of commutation decoder 28, inhibits the transmission of further drive commands to upper and lower drive circuits 40–45.

The $A_1$, $A_2$, and $A_3$ outputs from commutation sensors 27 are applied to a tachometer decoder circuit 140 which delivers drive signals 141–146 to a bank of analog switches 150, one of which is selectively energized at any time to select the proper output voltage from the six-phase analog tachometer. The detailed circuitry of appropriate brushless tachometer circuitry is disclosed in a copending commonly assigned patent application to Schmidt, Ser. No. 772,028, filed Feb. 25, 1977, which illustrates a four-phase brushless tachometer. Extension of the disclosed four-phase tachometer to a six-phase tachometer may be readily performed utilizing known techniques.

The $A_1$, $A_2$, and $A_3$ outputs which are representative of the shaft angular position of motor 75 are supplied from commutation decoder 28 to edge detector circuit 112 which together with the current sensor decoder 111 makes up the current sensor selection logic circuit shown in schematic form in FIG. 6. A commutation change signal is delivered from edge detector 112 on conductor 147 to a dead time circuit 148 which is a one-shot multivibrator which provides its output to the input of a multiple input inhibit gate 139 on conductor 149, as shown in more detail in FIGS. 7a and 7b. A further description of the function of the inhibit gate is also set forth below in connection with the detailed schematic of FIGS. 7a and 7b.

Driver Circuitry

Figure 2:
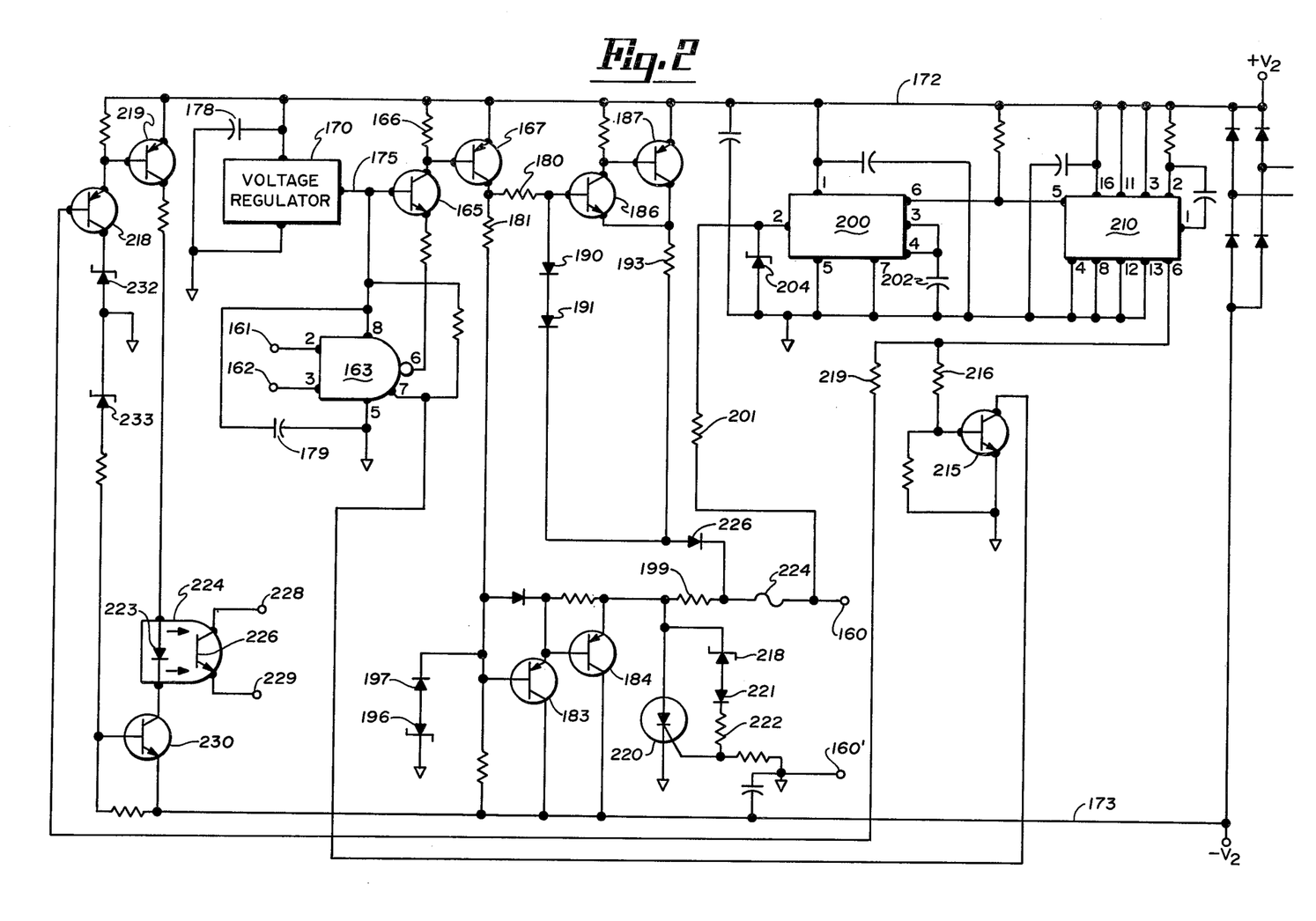
FIG. 2 is a schematic of one of the driver circuits.

Referring now to FIG. 2, a detailed schematic of the driver circuitry for providing the base drive current for the output switch transistors 48 through 53 shown in FIG. 1b is shown. Output terminal 160, shown in FIG. 2, is connected to provide the base drive current to the base of a high current capacity power transistor such as 48 which may be a simple high power transistor or multiple transistors connected in parallel. In the preferred embodiment shown, power transistors 48–53 are capable of delivering a current of up to 100 amps to the stator windings of motor 75 when supplied from a 230-volt DC bus 55 and 56.

In the initial condition in which an input of zero is applied to the isolated input terminals 161 and 162 of a high speed opto-isolator module circuit 163, a unit similar to the units manufactured by Hewlett Packard Corporation under the designation HCPL 2601, the output of that isolator circuit at terminal 6, as designated by the manufacturer, provides an open collector transistor which, when opto-isolator 163 is energized by the appropriate signal applied to terminals 161 and 162, becomes a current sink to the emitter of transistor 165, thereby allowing that transistor, which has its collector connected to the positive low voltage supply $V_2$ through a resistor 166, to turn ON and to turn transistor 167 ON also.

A voltage regulator module 170 provides a regulated DC voltage to opto-isolator 163. In the preferred embodiment, the voltage $V_2$ is present on the positive bus 172 and the voltage $-V_2$ is present on the negative bus 173 while the regulated output of voltage regulator 170 on conductor 175 is somewhat less than $V_2$. Capacitors 178 and 179 are used to minimize the noise present on the main DC bus 172 and the regulated output of voltage regulator 170 respectively. The voltages $+V_2$ and $V_2$ need not be highly regulated DC voltages.

When transistors 165 and 167 are turned ON by application of a signal to terminals 161 and 162 of optoisolator 163, the junction of resistors 180 and 181 is raised to a voltage approximating that on the positive bus 172 or $+V_2$ which acts to reverse bias transistors 183 and 184 while simultaneously forward-biasing transistors 186 and 187, turning them ON. Transistors 183–184 and 186–187 are Darlington connected, as shown in FIG. 2, to provide the appropriate degree of current gain for the driver circuit.

With transistors 186 and 187 forward-biased, diodes 190 and 191 form a constant voltage clamp across the series circuit comprised of the base emitter junction of transistor 186 and resistor 193 and force transistors 186 and 187 to function as a constant current source. In the preferred embodiment shown, the resistance of resistor 193 is approximately 0.33 ohms. The magnitude of the current is determined by the sum of the forward voltage drops across diodes 190 and 191 less the base emitter voltage of transistor 186 which results in a voltage across resistor 193 which, when divided by the resistance of resistor 193, yields a regulated base current for the output stage which is delivered to the base of an output switch via terminal 160 and returned to driver circuit ground from the output switch emitter whenever the driver is in the "ON" condition. This current regulation circuit provides a constant base current despite supply voltage variations and any variations which may be encountered in the base emitter voltage of the output transistor switch due to temperature or fluctuations in collector current.

When the input command signal at terminals 161 and 162 of opto-isolator 163 is removed, the output at terminal 6 of opto-isolator 163 switches to a non-conducting condition and turns OFF both transistors 165 and 167. As transistors 165 and 167 are turned OFF, they cause transistors 186 and 187 to turn OFF and remove the base drive from the output transistor powered by that driver. Also when transistor 167 is OFF, the base of transistor 183 returns to a voltage level determined by zener diode 196 and diode 197, and transistors 183 and 184 become forward-biased and turn ON to apply a reverse voltage to the base emitter junction of the output transistor associated with that driver for the purpose of removing accumulated excess charge from the junction to assure an extremely rapid return of the output power transistor from the saturated operating mode to a reverse bias mode with a minimum of operating time spent in the high power dissipation linear mode. The maximum reverse recovery or pull-down current that can be removed from the base of the output transistor by the driver circuit is determined by the ratio of the voltage across resistor 199 divided by the value of that resistor. When transistors 183 and 184 are conducting, the voltage across resistor 199 is equal to the zener breakdown voltage of zener diode 196 plus the forward voltage drop across diode 197 minus the two base emitter voltage drops for transistors 183 and 184. In the preferred embodiment shown, the resistance of resistor 199 is approximately one-half ohm. When the reverse recovery current flow has ceased, the magnitude of the output transistor reverse base emitter voltage is equal to the value of the drop across zener diode 196 plus the diode 197 diode drop less the base emitter drops of transistors 183 and 184. Thus, both the maximum reverse recovery current and the maximum reverse bias voltage are adequately and simultaneously controlled by the novel circuitry.

The driver circuit also includes additional protective features to minimize the chance of extensive damage to components should a single component malfunction. Although current flow is measured in conductors 78, 79, and 80 which supply the three motor windings, if any of conductors 78, 79, and 80 were shorted at a location preceding current sensors 84, 85, and 86, an extremely high fault current would result in the associated output transistor switches and would not be detected by current sensors 84, 85, and 86. This problem is compounded due to the very low inductance of the current path which allows a very fast rising current in the event of a short circuit. The individual output stages of the system are protected against a catastrophic overcurrent by additional circuitry, shown in FIG. 2. The additional circuitry includes a threshhold detector 200 which monitors the base emitter voltage of the associated output transistor at terminal 160 through a resistor 201. Should an overcurrent in the associated output stage occur, the regulated base current will permit the output transistor to come out of saturation, thereby causing both the collector-to-emitter and base emitter voltages to increase.

Circuit 200 is an MC3423 threshhold detector circuit manufactured by Motorola Semiconductor and other semiconductor manufacturers. The terminal designations indicated on FIG. 2 correspond to those assigned by the manufacturer.

Once the output transistor switch base emitter voltage at terminal 160 exceeds the preset threshhold level of circuit 200, the output of that module at terminal 6 switches from a high voltage to a low voltage and triggers circuit 210, a one-shot multivibrator manufactured by RCA or Motorola and other semiconductor manufacturers under the designation 4098. Zener diode 204 protects the input of module 200 from excessive voltage levels. The terminal designations shown for module 210 correspond to those assigned by the manufacturer. The input to one-shot 210 is applied to terminal 5. Transient base emitter voltage excursions at terminal 160 are prevented from triggering circuit 200 by a capacitor 202 which is connected between terminals 3 and 4 and ground and delays the response of the threshhold detector until the voltage persists for a preset time. In the preferred embodiment, a one microsecond switching delay is accomplished by use of a 100 pf capacitor 202.

Once one-shot 210 is triggered, its output at terminal 6 goes high, turning ON transistor 215 through resistor 216 and turning OFF transistor 218 through resistor 219. When transistor 215 is turned ON, it immediately disables or turns OFF the output of optical isolator 163 through its terminal 7 and thereby turns OFF this stage of the driver to interrupt the fault current before it reaches destructive levels.

When transistor 218 is turned OFF, transistor 219 is also turned OFF and interrupts the current through LED 223 of optical isolator 224. The interruption of the current through LED 223 causes transistor 226 to cease conduction and open the path between terminals 228 and 229 which are connected to fault interlock circuitry which in turn connects to the central inhibit gate 139. The opening of this path causes the central inhibit gate 139 to turn OFF the drive signals to all six output stages 48-53. The circuitry remains latched in this inhibit mode until the fault condition is remedied and the fault latches are manually reset. Once the output of the one-shot 210 goes high to locally inhibit a particular driver, it produces a pulse having a pulse duration which is sufficiently long for the fault signal to be received by the main inhibit circuit 139 and to remove the input drive signal from all drivers.

The base emitter voltage monitoring of each output power stage also prevents circuit operation if any of the six output stages are disconnected from their particular driver. If this should happen, instead of terminal 160 being clamped to ground via a base emitter junction of the associated output power transistor, the two points would be open-circuited. When the base drive controlling transistors 186 and 187 were commanded to turn ON, a high voltage condition would exist at terminal 160 which would be sensed by circuit 200 which would then inhibit the entire motor control system through transistor 218 and 219 until the fault condition were corrected by connecting the driver to the power stage and the circuit reset.

A common mode of destruction for power transistors in a collector-to-base short circuit which, if it occurs to one of the transistors in an output stage, would not only destroy that particular transistor but would also result in the full DC voltage of the main bus 55 appearing at terminal 160. This high voltage appearing at terminal 160 would cause catastrophic damage to the driver circuit of FIG. 2 if uncontrolled. When such a high voltage does appear at terminal 160, it causes zener diode 218 to begin to conduct and drives a gate current to a power SCR 220 through diode 221 and resistor 222. SCR 220 then turns ON and clamps the emitter of transistor 184 to essentially ground potential. A high fault current is established in fuse 224 when SCR 220 is turned ON, but the fault current is kept to a finite level by resistor 199. Thus, SCR 220 clamps the drive circuit at a tolerable level until fuse 224 clears to disconnect the driver from the fault. Diode 226 prevents the upper driver stage from receiving the high fault voltage until fuse 224 clears. While this protective action is taking place, threshhold detector 200 senses the over-voltage condition and transmits a fault signal through fault indicator to the central inhibit circuitry 139.

The network which incorporates transistors 218, 219, and fault transmitter 224 serves a dual function. It is used to transmit an indication of fault conditions in the driver and output stages as indicated above but also monitors the positive and negative driver supply voltages on buses 172 and 173. If either supply dips too low, the appropriate zener diode 232 or 233 ceases to conduct. This action causes either transistor 219 or 230 to turn OFF to interrupt the current in light emitting diode 223 of fault indicator 224 and to send a signal back to the main inhibit gate 139 while there is still sufficient supply voltage remaining to adequately turn off the output stage.

Current Sensor Selection Logic

The circuitry for the current sensor decoder 111 is shown in detail in FIG. 6. As indicated above in connection with the description of FIG. 1, it is necessary in a multiphase brushless motor to measure and assemble the various stator currents into a composite current signal which is analogous to the armature current in a conventional DC motor with brush commutation to provide an appropriate motor current feedback signal for closed loop operation.

The technique utilized in the present system involves the sensing of current in each motor leg by sensors 84, 85, and 86 and the use of amplifiers 105, 106, and 107 to invert the individual signals representative of current to provide six current signals (plus or minus $I_1$, plus or minus $I_2$, plus or minus $I_3$) for use in constructing the composite motor current.

The construction of the composite motor current is done by utilizing shaft position information relating to motor 75 which is derived from commutation sensors 27 which generate three position signals, $A_1$, $A_2$, and $A_3$, on conductors 29, 30, and 31. In the preferred embodiment shown, the commutation sensors are individual Hall effect switches used to generate the motor commutation code. The three sensor and encoder combinations are displaced 60° of electrical position from each other to provide a unique three-bit code for each 60° of electrical rotation as indicated in FIG. 3.

For each code generated by the Hall switches, there are two motor phases energized. FIG. 3 indicates the relationship between the positions, codes, and energized motor phases.

Figure 3:
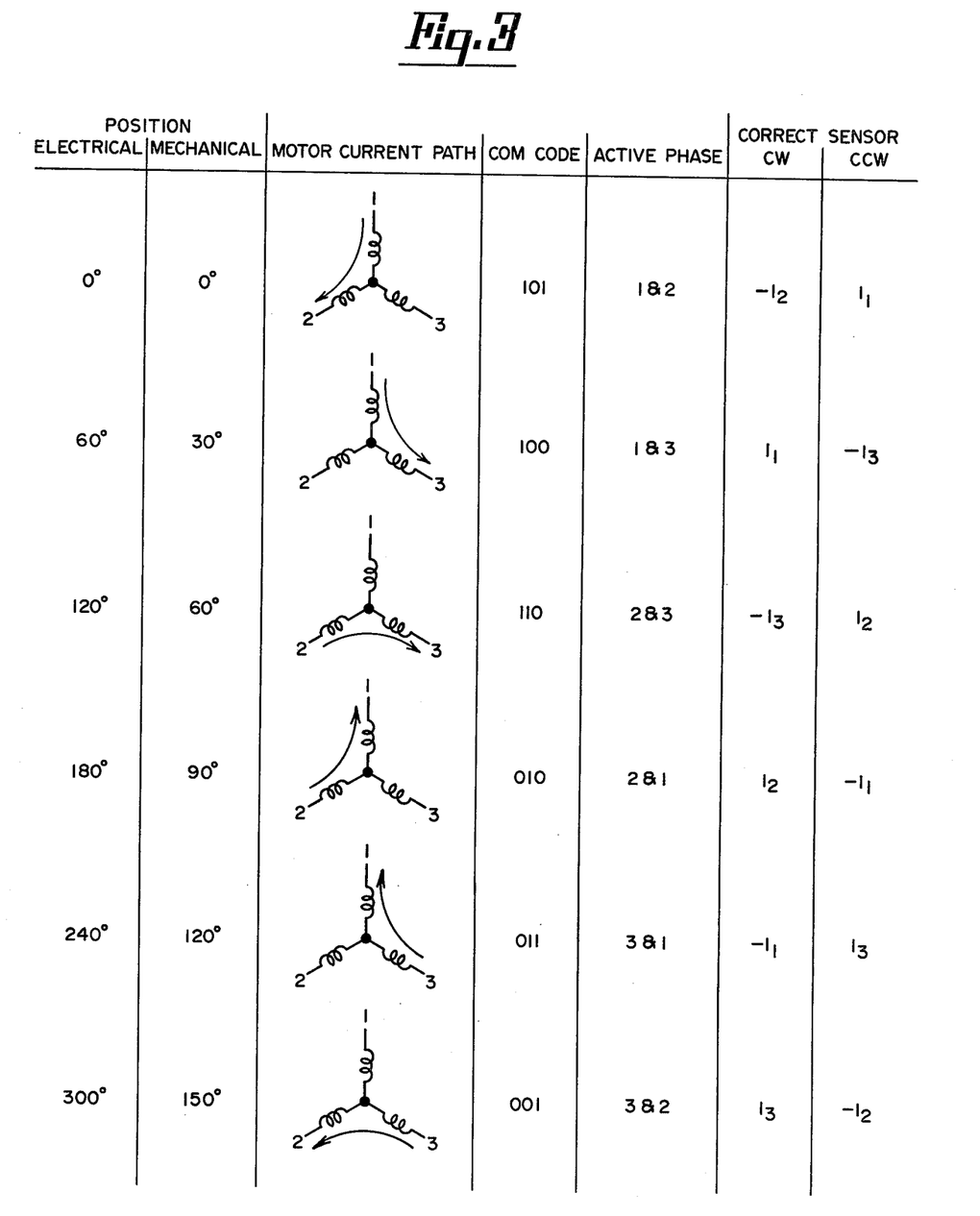
FIG. 3 is a table illustrating the relationship between motor shaft position, direction of rotation, commutation codes, and motor current path.

For an example of the operation of the current selection circuit, reference is made to the first position in FIG. 3 which shows the current into phase 1, $I_1$, positive and the current into phase 2, $I_2$, negative corresponding to the condition with upper output stage 48 and lower output stage 51 energized so that either $I_1$ or $-I_2$ would appear to be the correct choice for the current to be selected as representative of the motor current. However, only one of these signals would be correct since the choice is dependent upon the direction of rotation of the motor. The reason for this is that only one of the two motor phases was carrying current in the previous commutation position. Determination of which phase was energized in the previous commutation position as well as in the present position is rotational direction dependent. The winding which was not carrying current when the motor was in the previous commutation position requires some time to overcome the inductance to achieve the average motor current; so, if an incorrect sensor choice is made, the composite motor current wignal would contain "dropouts" at each commutation interval which would result in serious cogging when the motor is operated at low speed and high torque.

The key to the current sensor selection circuit is that both the direction of motor rotation and the motor shaft position are used to select the correct representative current signal. Although the selection techniques are illustrated in FIGS. 3–6 for a three-phase brushless motor, it is clear that the techniques can be extended using the principles of the present invention to apply to brushless motors having any numbers of phases.

Figure 4:
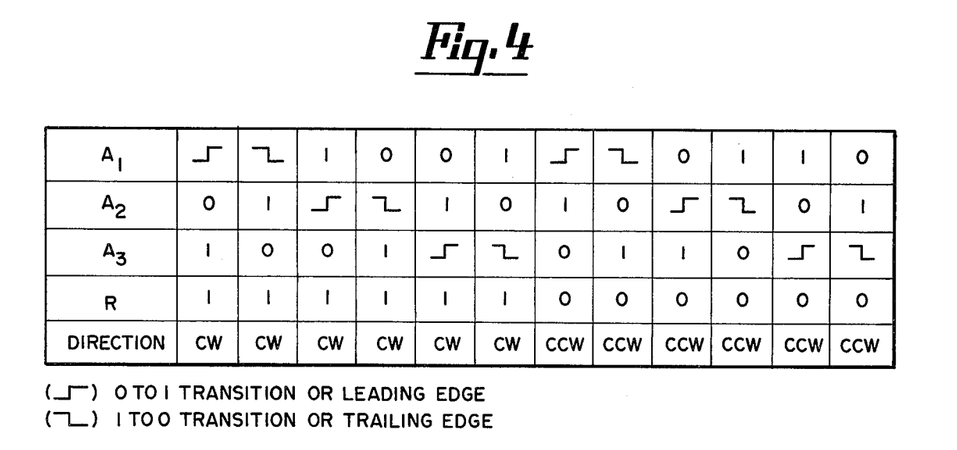
FIG. 4 is a chart showing the truth table used to determine the direction of motor rotation from the commutation sequence detected by the commutation sensors.

A table for the current selection logic illustrating the relationship between rotor direction and the sequence of commutation codes is shown in FIG. 4 in tabular form. The table may be used to determine the direction of motor rotation from the commutation sequence. The designations shown in the chart are logical 0, logical 1, and the transition from 0 to 1, as shown in the first block for the $A_1$ sensor and the transition from 1 to 0 as shown in the second block of the $A_1$ sensor. Referring to the information in FIG. 4, the two equations for rotation may be derived. If R is a logic signal indicative of clockwise rotation, and $A_1 \uparrow$, $A_2 \uparrow$, and $A_3 \uparrow$ represent leading edges of the respective position encoder signals, and if $A_1 \downarrow$, $A_2 \downarrow$, and $A_3 \downarrow$ represent the trailing edges of the respective sensor signals, equations for R and its complement result as indicated below.

$$R = A_1 \uparrow \overline{A}_2 A_3 + A_1 \downarrow A_2 \overline{A}_3 + A_1 \overline{A}_2 \cdot \uparrow \overline{A}_3 + \overline{A}_1 A_2 \downarrow A_3 + \overline{A}_1 A_2 A_3 \uparrow + A_1 \overline{A}_2 A_3 \downarrow \qquad \text{Equation 1}$$

$$\overline{R} = A_1 \uparrow A_2 \overline{A}_3 + A_1 \downarrow \overline{A}_2 A_3 + \overline{A}_1 A_2 \cdot \uparrow A_3 + A_1 \overline{A}_2 \downarrow \overline{A}_3 + A_1 \overline{A}_2 A_3 \uparrow + \overline{A}_1 A_2 A_3 \downarrow \qquad \text{Equation 2}$$

Referring now to FIG. 6, a schematic for realizing R as a sequential function of $A_1$, $A_2$, and $A_3$ is shown. The circuit in FIG. 6 receives the signals $A_1$, $A_2$, and $A_3$, generates R, and uses those four signals to select the signal indicative of the proper current, according to the truth table in FIG. 5, for use as a composite current signal in the feedback loop.

Referring now to FIG. 6, the detailed schematic of the current sensor selector logic, a number of standard logic circuits are shown. The commutation sensor output signals, $A_1$, $A_2$, and $A_3$, are applied to the inputs of exclusive OR gates 250, 251, and 252 which are located on a single module identified as a 4507 by the manufacturer, Motorola. Although DC power and ground connections are shown only with respect to exclusive OR 251, it will be understood that the other exclusive OR circuits 250 and 252 also receive their power from those connections. A similar approach is used to indicate the power connections to the other logic gates shown in FIG. 6 with the connection shown only with respect to one gate in a multiple gate device. The circuitry driving Register 270 is sequential combinational logic used to realize the rotational signal $ according to FIG. 4. Register 270 is used to assure that data is settled before being applied to the four bit decoder 300 and its associated gates which select a current signal from the four inputs by the input-output relationships shown in FIG. 5.

The output of exclusive OR circuits 250, 251, and 252 is a logic 1 if either input is a 1 but not if both inputs are a 1 nor if both inputs are a 0. Since each of the exclusive OR circuits 250, 251, and 252 has an input RC network comprised of resistors 255, 256, and 257 and capacitors 258, 259, and 260 respectively, attached to one of its inputs, a positive going signal applied at the $A_1$, $A_2$, and $A_3$ inputs will result in outputs from exclusive OR circuits 250, 251, and 252 which consist of a short pulse which persists until capacitors 258, 259, and 260 charge sufficiently to develop a voltage sufficient to switch the outputs back to a zero state. Thus, the circuits 250-252 act as edge detectors and sense the transition of the position signals from one level to another.

The outputs of exclusive OR circuits 250, 251, and 252 are connected to a three-input NOR gate 265 manufactured by Motorola or RCA under the designation 4025. When a positive pulse is received from either of the exclusive OR gates 250, 251, or 252, the output of NOR gate 265 switches from a 1 to a 0 condition which produces a 0-to-1 transition at the output of inverting amplifier 266 after a delay caused by resistor 267 and capacitor 268. A "commutation change" signal on conductor 147 is also produced at the output of NOR gate 265.

The output of inverting amplifier 266 is used to drive the clock input of a latching data register 270 which is designated by Motorola or RCA as 4076. Amplifier 266 and amplifiers 271, 272, 273, and 274 are inverting buffer amplifiers designated by Motorola or RCA as 4049. The $D_4$ input of flip-flop 270 receives its signal from an inverting amplifier 274 which is driven by a two-input NOR gate 277 identified by Motorola or RCA as a 4001 which receives its inputs from two three-input NAND gates 278 and 279 which are identified as F4023.

NAND gate 278 in turn receives its three inputs from further three-input NAND gates 281, 282, and 283 while NAND gate 279 receives its three inputs from further NAND gates 286, 287, and 288. NAND gate 281 receives its three inputs from AND gate 290, $A_3$ and $\overline{A}_2$. NAND gate 282 receives its three inputs from AND gate 291, $A_2$, and $\overline{A}_3$. NAND gate 283 receives its three inputs from AND gate 292, $A_1$, and $\overline{A}_3$. NAND gate 286 receives its three inputs from AND gate 293, $A_3$, and $\overline{A}_1$. NAND gate 287 receives its three inputs from AND gate 294, $\overline{A}_1$, and $A_2$. NAND gate 288 receives its three inputs from AND gate 295, $A_1$, and $\overline{A}_2$. AND gates 290-295 are identified as 4081 two input AND gates.

The data appearing at the $D_4$ input of latching data register 270 is determined from the equation for R given above. Since the time delay determined by resistors 255, 256, and 257 and capacitors 258, 259, and 260 is longer than the time delay set up by resistor 267 and capacitor 268, the $A_1$, $A_2$, $A_3$, and R data reaches the $D_1$-$D_4$ inputs of register 270 before the clock pulse is applied by NOR gate 265 and buffer amplifier 266. The appearance of the clock pulse then clocks the data appearing at the $D_1$-$D_4$ inputs of register 270 to the $Q_1$-$Q_4$ outputs and to the A, B, C, and D inputs of decoder demultiplexer 300. Decoder circuit 300 is, in the preferred embodiment, a 4514, "One of 16 Decoder-Demultiplexer" as manufactured by Motorola or RCA. Circuit 300 selects an output determined by the data on the address inputs in accordance with its internal truth table. The outputs of decoder circuit 300 are shown in FIG. 5 as a function of R delivered by register 270 and $A_1$, $A_2$, and $A_3$ received from the commutation sensors 27.

Since each output current is selected by two decoder output states, NOR gates 304-308 are connected to the appropriate outputs of decoder 300, as indicated in the table shown in FIG. 5, to produce, at their outputs, logic signals 113-118 used to drive the appropriate analog switches of switch module 99 to select current signals $I_1$, $I_2$, $I_3$, $-I_1$, $-I_2$, and $-I_3$ respectively for delivery to buffer amplifier 120 in FIG. 1 as the composite feedback current.

Thus, the circuit shown in FIG. 6 utilizes a three-bit commutation code based upon the signals generated by commutation sensors 27 as used to select two of the six available current signals, and the rotation direction bit derived by the circuit of FIG. 6 from the three commutation sensor outputs makes the final choice between the two current signals. Since the logic is sequential, the choice between the two currents made at turn on when the rotation is zero, may be either one of the two signals chosen by the commutation logic. This choice ambiguity at turn on causes no problem because either signal is correct until rotation of the motor begins. The timing components 255-260 used in the exclusive OR edge detectors 250-252 are set to give pulses long enough to clock the data register 270 while the delay timing elements 267 and 268 were chosen to give enough delay to assure that the rotation and position data is present at the $D_1$-$D_4$ inputs of register 270 before the clock pulse arrives. Of course, the edge detector pulse width determined by elements 255-260 plus the delay time determined by elements 267 and 268 must be much less than the minimum time that the motor remains in a particular commutation position. This minimum time is determinable from the maximum rated motor speed and the number of commutation positions per motor revolution.

Commutation Decoding Logic

Figure 7B:
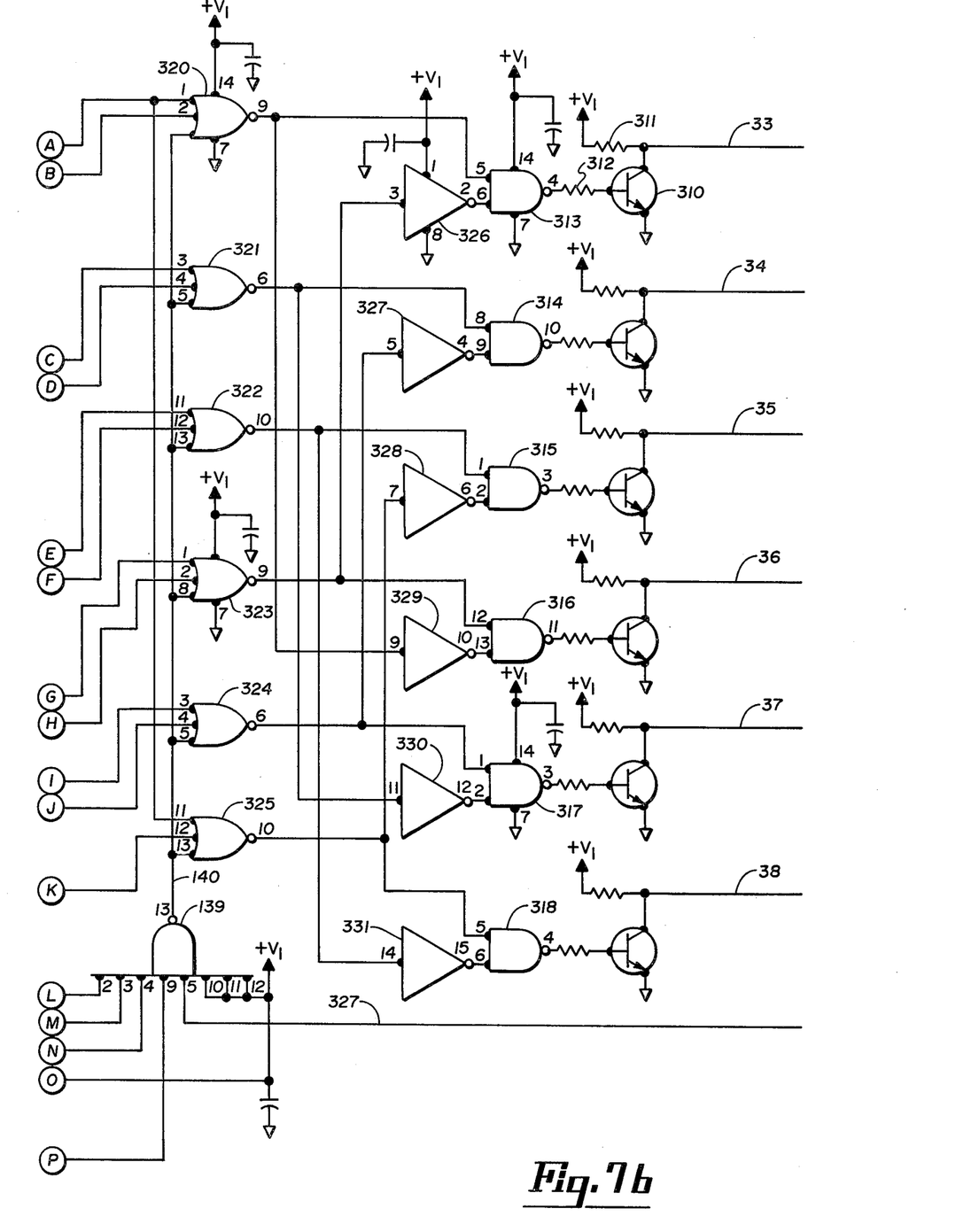

The details of the commutation decoding and steering logic are shown in FIG. 7. Various modules and conductors shown in FIG. 7 are marked with the identification numbers with which they were identified in FIGS. 1a and 1b. The output signals from the commutation decoder 28 are shown on conductors 33-38. A typical output such as the one on conductor 33 has a buffer transistor 310, shown in FIG. 7b, and a pull-up resistor 311 connected to a positive power supply $V_1$. The base drive for transistor 310 is provided by resistor 312 which is connected to an output terminal of a two-input NAND gate 313 manufactured by Motorola or RCA under the designation 4011. Entirely analogous circuitry is provided for the signals on conductors 34-38. Further NAND gates 314, 315, 316, 317, and 318 drive the output circuitry. As is the case with the other figures, power is explicitly shown being applied only to gates 313 and 317 of the output gates. Gates 313, 314, 315, and 316 are packaged in a single module as are gates 317 and 318, and the manufacturer's pin designations are indicated for each gate.

Gate 313 receives one input from the output of a three-input NOR gate 320, while gates 314-318 each respectively receive a single input from three-input NOR gates 321-325. NOR gates 320-325 are Motorola or RCA 4025 triple three-input NOR gates, and the pin designations shown are those assigned by the manufacturer. The other inputs to the two input NAND gates 313-318 are provided respectively by inverting amplifiers 326-331 respectively which are inverting buffer amplifiers manufacturered by Motorola or RCA as a 4049 six-amplifier module. As shown in FIG. 7, the inputs to amplifiers 326-331 respectively are connected respectively to the outputs of gates 323, 324, 325, 320, 321, and 322.

One of the three inputs of each of NOR gates 320-325 is connected to the output of NAND gate 139, a Motorola or RCA 4068, eight-input NAND gate. When the output of NAND gate 139 on conductor 140 is a logic 1, it drives the outputs of NOR gates 320-325 to a logic 0 and in turn forces the outputs of gates 313-318 to a logic 1 condition turning on shunt transistor 310 and the other similar shunt transistors to clamp the voltage on conductors 33-38 to a zero level. Thus gate 139 acts to inhibit the input signals to the drivers unless all of its input signals are logic ones. Thus, for example, if fault indicator 224 of the driver in FIG. 2 is actuated, while its terminal 228 is connected to a positive voltage $V_1$ and terminal 229 is connected through conventional fault latch circuitry, not shown, to one of the inputs of three-input NOR gate 326, a Motorola or RCA 4025, the output of that NOR gate will be forced to a logic 0 to indicate a failure in one of the drive modules to cause inhibit gate 139 to inhibit operation of the entire control circuit. Similarly, a power-up inhibit command on conductor 327 must be a logic 1 to permit operation of the control circuit. This signal is governed by conventional circuitry, not shown, and is a logic 0 during the initial application of power to the system and switches to a logic 1 after the supply voltages have stabilized. Input terminal 3 of gate 139 is connected to the digital current limit output through inverter gate 330A from circuit 135. The input at terminal 3 is a logic 1 when the composite current being measured is within the current limits established by circuits 122 and 124. Gate 139 receives a further inhibit input on terminal 9 from an opto-isolator which may receive an inhibit command from a supervisory computer if desired. If no computer is used, terminal 9 can be connected to $+V_1$, as was the case with unused terminals 10, 11, and 12.

The final inhibit signal applied to inhibit gate 139 is the signal applied to terminal 2 by monostable 148, one-half of a 4528 dual retriggerable, resettable monostable multivibrator which receives its input from three-input NOR gate 26. NOR gate 26 has one grounded input and receives its other two inputs from conductor 147 through an inverting amplifier 330 and from an edge detector monostable multivibrator 112 formed from the RCA or Motorola 4507 exclusive OR gate module 112 and resistor 331 and capacitor 332. The input to that edge detector is from conductor 25 which is the pulse width modulated output of comparator 20 which receives both the current summing amplifier error signal and the triangular signal generated by triangle generator 22. One-shot 148 serves to inhibit the drive signals for a predetermined short time interval on the order of 25 microseconds after either a commutation change or a change in the state of the pulse width modulated drive command from modulator 20 to permit the power transistor which had been conducting to be completely turned off prior to application of drive command to another power transistor.

The drive commands for conductors 33-38 are derived from the three input signals on lines 29, 30, and 31 and from the PWM signal on 25. The signals on lines 29, 30, and 31 are received from the commutation sensors 27. The $A_1$ input signal on conductor 29 is applied to a Schmidt trigger comprised of buffer amplifier 340 and resistors 342, 343, and 359. Diodes 344 serve as voltage clamps on the input. Buffer amplifier 340 and further buffer amplifiers 345 and 346 are individual amplifiers which are part of a Motorola or RCA 4050 hex non-inverting buffer amplifier module, and the pin designations shown are those specified by the manufacturer. Similar input networks are also connected at the input of amplifiers 345 and 346. The outputs of buffer amplifiers 340, 345, and 346 are connected respectively to the inputs of three 4507 exclusive OR gates 347, 348, and 349 which are a part of the same module and have manufacturers terminal designations as indicated. Exclusive OR gate 112 is the fourth OR gate on the module containing exclusive OR gates 347, 348, and 349. The second input to each of exclusive OR gates 347, 348, and 349 is provided from the modulator output on conductor 25 from comparator 20. The outputs of exclusive OR gates 347, 348, and 349 are respectively passed through lag circuits comprised of resistors 350, 351, and 352 and capacitors 353, 354, and 355 to the inputs of non-inverting buffer amplifiers 356, 357, and 358 which are also RCA or Motorola 4050 buffer amplifiers on the same module as amplifiers 340, 345, and 346. Each of amplifiers 340, 345, and 346 has a feedback resistor 359 and 360 and 361 respectively, while amplifiers 356, 357, and 358 have feedback resistors 362, 363, and 364 respectively. The output of amplifier 356 is connected to the inputs of NOR gates 322 and 323 and to the input of NOR gate 320 through inverting buffer amplifier 366. Similarly, the output of amplifier 357 is connected to the input of NOR gates 320 and 324 and to the input of NOR gate 321 through inverting amplifier 367. The output of amplifier 368 is connected to the inputs of NOR gates 321 and 325 and is connected to the input of NOR gate 322 through inverting buffer amplifier 368. Inverting amplifiers 366, 367, and 368 are inverting buffer amplifiers manufactured by Fairchild Semiconductor under the designation 4049.

The circuitry of FIG. 7 controls the output switches to energize the individual brushless motor windings based upon the shaft position sensor inputs and the pulse width modulated command. Inhibit gate 139 provides an inhibit function to block transmission of driver command signals for a predetermined time after a change in state of the modulator signal or for a predetermined time interval when the digital current limit is exceeded or until manually reset if a fault occurs in one of the driver circuits. Inhibit gate 139 also inhibits transmission of drive commands during the initial operation of the system after power is applied and for a predetermined time interval after a commutation change or from a supervisory computer or manual inhibit command.

While a specific embodiment has been shown and described herein, it is believed that the invention encompasses the broader concept of reliably controlling a high power DC brushless motor with an effective current signal as described in the appended claims.

What is claimed is:

1. A closed loop electric motor control system for electronically commutating a motor comprising a plurality of motor windings each of which is connected through power switching means to a direct current supply means, said system comprising, in combination:
  position sensor means for providing discrete output signals indicative of the shaft angle of said motor, each of said output signals defining a commutation segment;
  comparison means for comparing an operating characteristic of said motor to a reference characteristic and developing pulse width modulated error signal related to the difference between the reference characteristic and the actual operating characteristic;
  decoding and steering logic means connected to receive said error signal from said comparison means and also responsive to the output signals from said position sensor means for providing drive signals to certain of said power switching means for sequentially energizing at least two of said motor windings to operate said motor responsive to said error signal thereby to reduce the magnitude of said error signal when the operating characteristic approaches said reference characteristic, said decoding and steering logic means operative to energize only power switching means associated with certain predetermined windings for each commutation segment whereby said motor shaft is driven by only those windings which produce maximum available torque; and inhibit means constructed and arranged to block the said decoding and steering logic means from providing any drive signals when said inhibit means receives an inhibit signal.

2. The invention claimed in claim 1 above also comprising means for generating an inhibit signal for a predetermined time interval when the shaft angle of said motor moves from one commutation segment to an adjacent commutation segment to permit a conducting portion of said motor switching means to be completely turned off prior to energizing a previously non-conducting portion of said motor switching means.

3. The invention claimed in claim 1 wherein each of said power switching means comprises at least one drive circuit for switching a power transistor connected to switch current from a direct current supply means, said drive circuit comprising:

a low voltage source of positive and negative direct current voltages;

first switching means connected to receive an input command signal, said first switching means constructed and arranged to provide a first output signal when said input command signal has a first characteristic and to provide a second output signal when said input command signal has a second characteristic;

a positive current drive means connected to receive output signals from said first switching means, said positive current drive means connected to receive a positive voltage from said low voltage source and constructed and arranged to provide a regulated drive current to the base of said power transistor only when said switching means provides said first output signal; and negative current drive means connected to receive output signals from said first switching means and constructed and arranged to be responsive to said second signal to reverse bias the base emitter junction of said power transistor with a voltage having a controlled magnitude while controlling the maximum recovery current during turn-off of said power transistor.

4. The invention claimed in claim 3 wherein: said drive circuit also includes threshhold detecting means for monitoring the base emitter voltage of said power transistor and providing a first output signal when the base emitter voltage of said power transistor exceeds a predetermined threshhold limit and said drive circuit also including second switching means responsive to said first output signal of said threshhold detecting means for overriding input command signals to said switching means by forcing the output of said first switching means to deliver said second output signal.

5. The invention claimed in claim 4 wherein said second switching means also delivers an inhibit signal to said inhibit means when it receives said first output signal from said threshhold detecting means.

6. The invention claimed in claim 3 wherein:

fuse means are connected between both said positive and negative current drive means and the base terminal of said power transistor;

current limiting means are provided between said fuse means and said negative current drive means;

third switching means are provided between the point of connection of said current limiting means and said negative current drive means and ground; said third switching means including voltage measuring means for providing a switch turn-on command to said third switching means when the voltage at said point of connection exceeds a predetermined threshhold level associated with the detection of failure conditions which result in voltage from the high voltage bus appearing at the base of said power transistor, said third switching means being constructed and arranged to clamp the voltage which would otherwise be applied to the components of the drive circuit and to assure rapid operation of said fuse means by application of a current whose magnitude is controlled by said current limiting means.

7. The invention of claim 3 wherein monitoring means are provided for monitoring the magnitudes of the positive and negative voltages of said low voltage source and for inhibiting operation of said first switching means by forcing its output to deliver said second output signal in the event of a failure in said low voltage source of positive and negative direct current voltages to cause said negative current drive means to reverse bias said power transistor.

8. The invention claimed in claim 7 wherein said monitoring means also delivers an inhibit signal to said inhibit means when it detects a failure in said low voltage source of positive and negative direct current voltages.

9. The invention claimed in claim 1 wherein a current feedback signal indicative of the effective motor current, is applied to said comparison means, said current feedback circuit comprising, in combination:

current sensing means for continuously measuring the instantaneous current flow in each winding of said motor;

signal conditioning means constructed and arranged to cooperate with said current sensing means to produce a plurality of positive and negative output signals having magnitudes proportional to the magnitude of the current flow in each stator winding;

direction indicating means constructed and arranged to receive discrete output signals from said position sensor means and to provide a first output signal indicative of rotation of said shaft in a first direction and a second output signal indicative of rotation of said shaft in the opposite direction;

fourth switching means connected with a controllable switching element in series with each of the positive and negative output signals produced by said signal conditioning means;

logic means connected to drive said switching means, said logic means responsive to the output signals of said direction indicating means and to the discrete output signals from said position sensor means to enable conduction of only the one of the switching elements of said switching means which is in series with a positive or negative output signal produced by said signal conditioning means representative of the stator current driving the motor.

* * * * *